(No Model.)  3 Sheets—Sheet 1.
G. L. WEAVER.
HORSE HAY RAKE.
No. 546,980.  Patented Sept. 24, 1895.
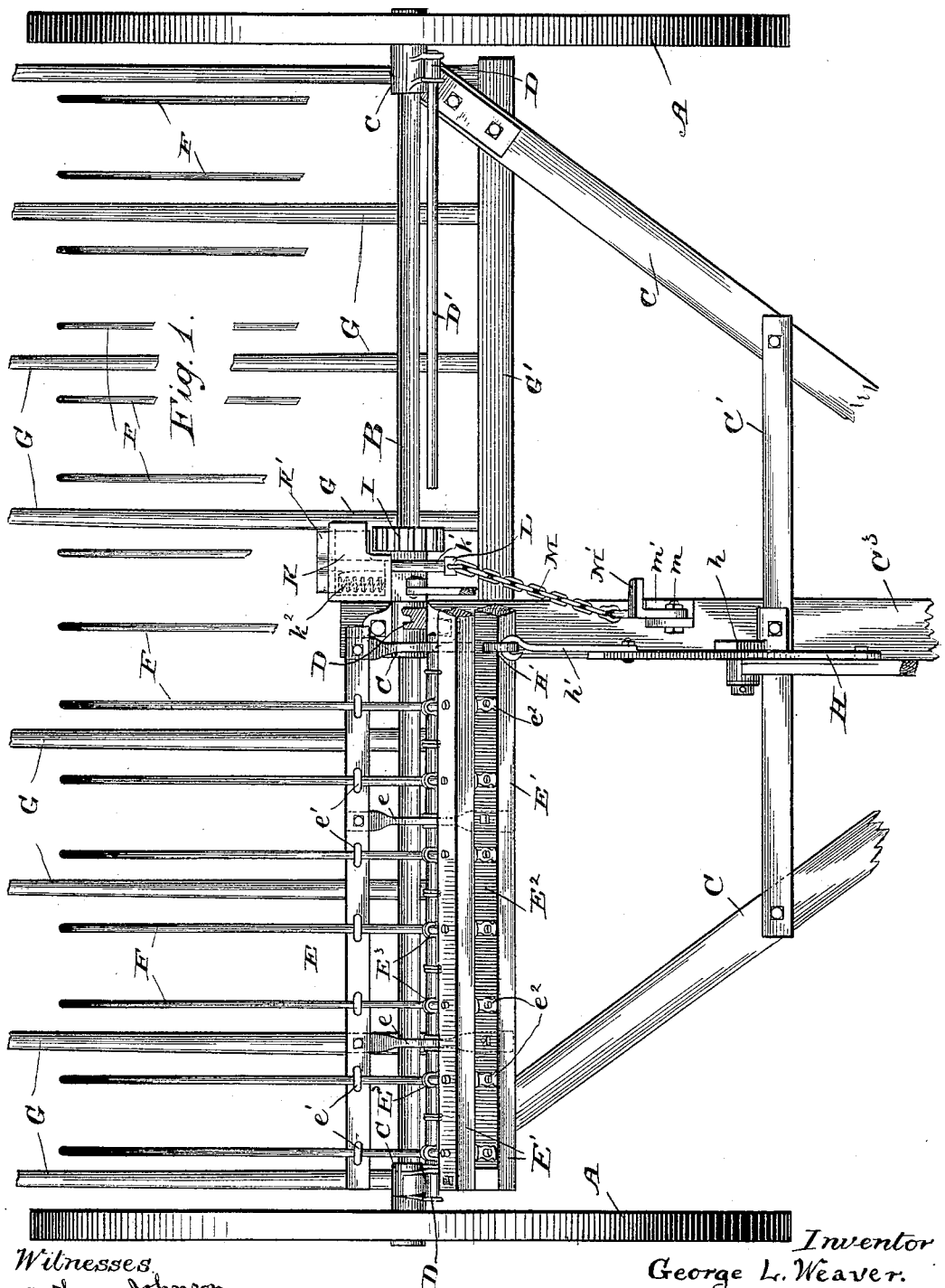
Witnesses
Arthur Johnson
A. J. Wells
Inventor
George L. Weaver.
By his Attorney.
Joseph G. Parkinson (No Model.)　　　　　　　　　　　　3 Sheets—Sheet 2.
G. L. WEAVER.
HORSE HAY RAKE.
No. 546,980.　　　　　　　Patented Sept. 24, 1895.
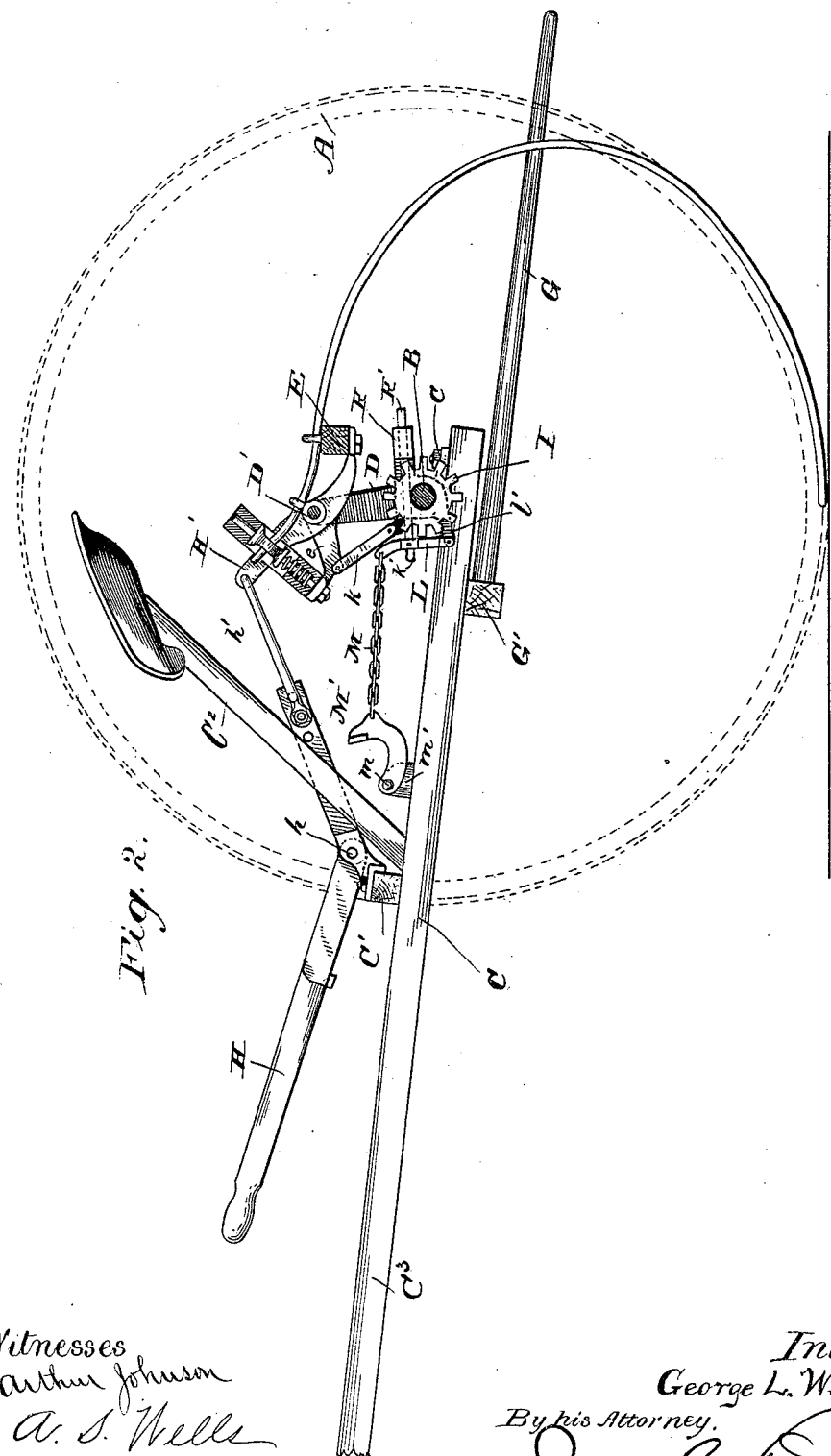
Witnesses
Arthur Johnson
A. S. Wells
Inventor:
George L. Weaver.
By his Attorney.
Joseph G. Parkinson (No Model.) 3 Sheets—Sheet 3.

G. L. WEAVER.
HORSE HAY RAKE.

No. 546,980. Patented Sept. 24, 1895.

Witnesses.
Arthur Johnson
A. S. Wells

Inventor
George L. Weaver.

By his Attorney.
Joseph G. Parkinson

UNITED STATES PATENT OFFICE.

GEORGE L. WEAVER, OF DAYTON, OHIO, ASSIGNOR TO THE OHIO RAKE COMPANY.

HORSE HAY-RAKE.

SPECIFICATION forming part of Letters Patent No. 546,980, dated September 24, 1895.

Application filed July 29, 1891. Serial No. 401,100. (No model.)

*To all whom it may concern:*

Be it known that I, GEORGE L. WEAVER, a citizen of the United States, residing at Dayton, in the county of Montgomery and State of Ohio, have invented certain new and useful Improvements in Horse Hay-Rakes, of which the following is a specification.

This invention relates, primarily, to automatic tripping and dumping mechanism applied to the well-known "Hollingsworth hay-rake," patented February 2, 1864, No. 41,433, in which the teeth are supported by a rocker-frame oscillating on an axis distinct from that of the rake-axle to change such rake from a hand-dumping rake to what is known as a "self-dumping rake;" but it will be obvious from the ensuing description that such dumping and tripping devices are capable of more extended application and are not limited in their efficacy to the Hollingsworth rake alone. In some respects the improvements resemble those made the subject of Letters Patent of the United States granted Sebastian Ritty on the 10th day of August, 1886, No. 346,947, wherein a reciprocating dog mounted in a housing attached to the rake-head is caused to engage with a ratchet-wheel upon a revolving through-axle, around which the said head vibrates, so that the continued revolution of the axle may raise the teeth to discharge the accumulated load, and the dog then be released from engagement with the ratchet to allow the teeth to drop to working position; but whereas Ritty employs a chain to draw the dog into engagement and a fixed stop to throw it out of engagement, I propose to employ a lever, treadle, and intermediate connection, whereby the dog may be drawn into engagement while in normal position and thereafter thrown out of engagement by the same devices drawn taut or into line with each other by its revolution around the axle in connection with the rocker-frame.

Figure 4:
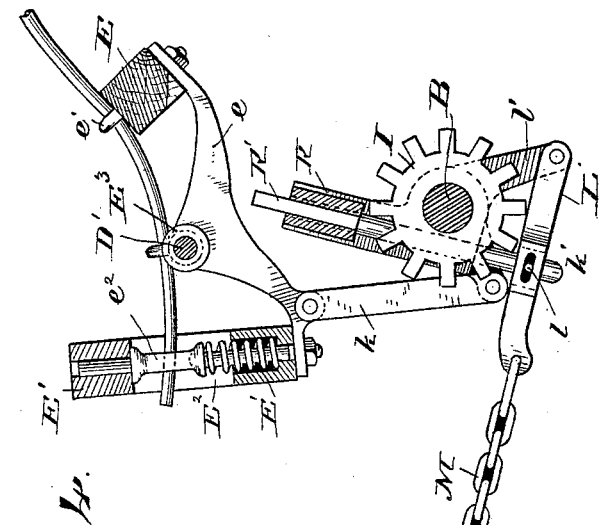
Figure 6:
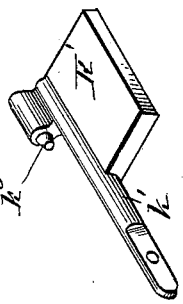
Figure 3:
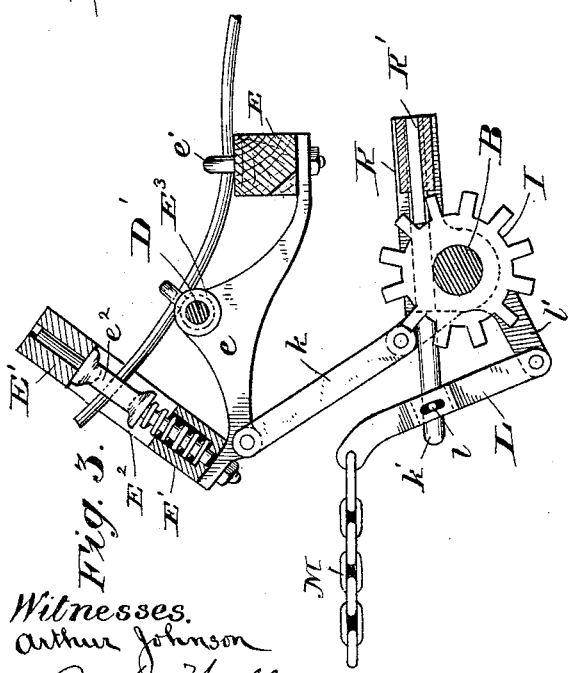
Figure 5:
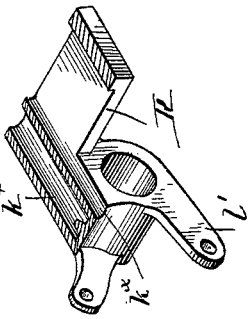

In the drawings, Figure 1 is a top plan view of a Hollingsworth hay-rake embodying my invention. Fig. 2 is a side elevation, partly in section, thereof. Figs. 3 and 4 are enlarged details of the tripping devices and rocker-frame. Fig. 5 is an enlarged detail in section of the housing for the reception of the dog, and Fig. 6 an enlarged detail in perspective of said dog.

A represents the carrying-wheels of the rake, and B the revolving through-axle connected at each end to said wheels in the usual manner by backing-ratchets, so that it may be revolved only when the rake is going forward, and so that either of the wheels which happens to be advancing may rotate the axle, while the other wheel is idle or even backing—as, for instance, in making a turn at the end of a field.

C is the draft-frame connected with the axle by bearing-boxes $c$ and constructed with an appropriate number of cross-bars C' for the attachment of the seat-standard C² and hand-dumping lever and such other parts of the mechanism as may be desired, and C is the draft-tongue braced by the hounds of the draft-frame, of which frame it forms a part, and, like said hounds, connected to the revolving axle centrally of its length by a bearing-box.

From the end bearings of the draft-frame upon the axle rise standards D, which receive a rod D', parallel with the axle, but obviously elevated thereabove, and upon this rod are journaled the transverse brackets $e$ of the rocker-frame, which is composed of a rear bar E, having guide-staples $e'$ at suitable intervals, and a forward bar E', having a longitudinal opening E², extending nearly its entire length, with spring-seated double-ended eye-bolts $e^2$ playing transversely of such opening opposite each of said staples. Upon the supporting-rod of this frame are mounted rocking blocks E³, spaced so as to bring an eye on each in line with the staples on the rear bar and with the aperture through the bolt in the forward bar of the frame.

The rake-teeth F are passed through the staples of the rear bar, which permit them the necessary up-and-down play, then through the eye on the rocking block, which will be adapted to clamp them to prevent their escape, as in the before-mentioned Hollingsworth patent, and finally through the aperture in the spring-seated double-ended eyebolt in the forward bar.

Clearers or cleaning-rods G project rearwardly between the rake-teeth from a bar G', secured to the under side of the draft-frame, and serve to hold the load down whenever the teeth are elevated, and thereby cause it to clear the points of said teeth.

The hand-lever H is of elbow shape, pivoted at the angle to a bracket $h$ from one of the cross-bars of the draft-frame, and its short arm is connected by the link $h'$ with the forward end of a tilting bar or arm H', pivoted to the rod which supports the rocker-frame, and at its rear end bolted to the rear bar of said frame. By means of this hand-lever the rocker-frame may be swung around the supporting-rod and the teeth elevated without employing the draft of the team. When, however, the hand-lever is thrown down, the shorter arm of the elbow will come practically in line with the link which connects it with the tilting arm of the rocker-frame and form a sort of toggle-lock to hold the teeth to their work. In conveying the machine from one field to another or along a roadway the hand-lever may also be used in the customary way to secure the teeth in an elevated position during the journey.

Keyed fast to the revolving through-axle, at or near the center thereof, is a toothed wheel I, and alongside this wheel is collared a housing K, loosely journaled on the axle and connected by hinging-link $k$ to a central bracket of the rocker-frame, adjacent to the front bar thereof, and therefore in advance of the pivotal rod of the said rake head or frame. This housing has a horizontal bearing $k^x$ for the arm or spindle $k'$ of the trip-dog K', which dog is arranged to engage with the teeth of the tooth-wheel, as in the before-mentioned patent to Ritty, and held normally out of engagement by means of a spring $k^2$, seated at one end against the heel-projection $k^3$ of said dog, and at the other end resting in a socket $k^4$ in the housing. The end of this spindle has a slot-and-pin connection $l$ with a trip-lever L, pivoted at its lower end to an offset $l'$ from the housing, and at its upper or power end connected by a chain M with a foot-lever or treadle M', pivoted at $m$ to a standard $m'$ from the draft-tongue or other suitable part of the draft-frame. Instead, however, of the chain, a link may be used similar to the link interposed between the hand-lever and the rocking rake-head. Pressure upon the foot-lever in the forward direction will draw the dog into engagement with one of the teeth of the wheel, thus locking the housing to said wheel and causing it to swing around the axle with the revolution of the wheel, drawing, by means of the intermediate link connection, upon the front part of the rocker-frame in advance of its pivotal rod, and therefore tilting said rake-head and raising the teeth to clear the accumulated load. As the housing swings around, however, it gradually carries the two pivots of the trip-lever into line with the pivot of the treadle, or, in other words, draws the treadle and interposed chain or link as nearly as may be into a line including its own pivots and the pivot of the treadle, bringing all the devices taut and therefore jamming the lever up against the trip-dog and causing the latter to become disengaged, as in Fig. 4, and through the link connection simultaneously stopping the forward oscillation of the rocker-frame, when the weight of the rocker-frame will restore them and the rake-head, together with the tripping devices, to their normal position, or that from which they started in the dumping movement.

It is evident that so far as the employment of the trip-dog and link connection to a rocking rake-head is concerned the disengagement may be effected by different means than those described, and the link connection between housing and head may be with the rear of the head to push up against it instead of with the front to pull down upon it.

What, therefore, I claim as my invention, and desire to secure by Letters Patent, is—

The combination substantially as hereinbefore set forth, of the revolving through axle, the draft-frame connected with said axle by bearing boxes, the standards rising over said boxes, the rocker-frame pivoted upon a rod supported in said standards, the toothed wheel secured to the axle, the housing mounted loosely thereon alongside of the wheel, the link connecting said housing to the rocker-frame, the trip-dog and its spindle, the trip-lever pivoted to the housing and connected to the spindle of the dog, the treadle and a connection between said treadle and the trip-lever, arranged practically as described whereby the trip-dog is released by the action of the trip-lever as the connection between the latter and the treadle is drawn taut by the revolution of the axle.

GEORGE L. WEAVER.

Witnesses:
J. V. DUNNIHOE,
J. C. PATTERSON.